United States Patent
Raveendranathan Nair et al.

(10) Patent No.: US 12,350,593 B2
(45) Date of Patent: Jul. 8, 2025

(54) USER SUBSTITUTION IN ONLINE MULTI-USER EVENT

(71) Applicant: Rovi Product Corporation, San Jose, CA (US)

(72) Inventors: Govind Raveendranathan Nair, Bengaluru (IN); Sangeeta Parida, Bengaluru (IN); Udit Sharma, Panchkula (IN); Anil Kumar, Bengaluru (IN); Ved Prakash Mohapatra, Bengaluru (IN)

(73) Assignee: Rovi Product Corporation, San Jose, CA (US)

( * ) Notice: Subject to any disclaimer, the term of this patent is extended or adjusted under 35 U.S.C. 154(b) by 379 days.

(21) Appl. No.: 18/147,296

(22) Filed: Dec. 28, 2022

(65) Prior Publication Data

US 2024/0216821 A1    Jul. 4, 2024

(51) Int. Cl.
*A63F 13/795* (2014.01)
*A63F 13/35* (2014.01)

(52) U.S. Cl.
CPC ............ *A63F 13/795* (2014.09); *A63F 13/35* (2014.09)

(58) Field of Classification Search
CPC ........ A63F 13/795; A63F 13/35; A63F 13/49; A63F 13/73
USPC ......................................................... 463/42
See application file for complete search history.

(56) References Cited

U.S. PATENT DOCUMENTS

| | | | | |
|---|---|---|---|---|
| 2023/0173395 | A1* | 6/2023 | Cella | G06Q 30/06 463/25 |
| 2023/0201722 | A1* | 6/2023 | Cella | G06F 21/10 463/42 |
| 2023/0281618 | A1* | 9/2023 | Cella | G06Q 20/401 705/44 |

\* cited by examiner

*Primary Examiner* — Pierre E Elisca
(74) *Attorney, Agent, or Firm* — Lerner David LLP

(57) ABSTRACT

Generally disclosed herein is an approach for enabling a substitute user to continue from the original user's saved participation state when the original user left an online multi-user event. The original user's state may be stored as a token. The stored token may be generated based on a plurality of parameters including, but not limited to, the user's role, achievement, skills, and position. The stored token may be sent with an invitation to multiple prospective substitute users. One of the prospective substitute users may accept the invitation by downloading the token. The accepted prospective substitute user may participate in the online multi-user event continuing from the original user's saved state.

20 Claims, 10 Drawing Sheets

USER SUBSTITUTION IN ONLINE MULTI-USER EVENT

BACKGROUND

Online multi-user events such as online multi-player games have become popular. In online multi-user games, each player or participant may be assigned to a specific role defined in the game. A group of players or participants may strive together to achieve a common goal. Sometimes, one or more players may have to leave the game midway. In such cases, their roles or states may be abandoned. The abandoned roles or states may cause the progress of the games to stagnate or place the remaining players at a disadvantage in achieving the common goals. The abandoned roles or states may easily be taken over by other players if they are physically in the vicinity of the leaving player and have access to the device that the leaving player was using. However, if other players are not in the vicinity, the abandoned roles or states may not be revived.

BRIEF SUMMARY

Generally disclosed herein is an approach for providing a mechanism to store an event participation state when a participant leaves an online multi-user event. The approach also includes generating a token based on the stored event participation state. The generated token may then be sent to prospective substitute users via social media. The approach may further include selecting the right substitute user(s) from a group of prospective substitute users based on historical data.

An aspect of the disclosure provides a method for substituting a user in a multi-user online event. The method includes receiving, by one or more processors, a request from a first user for leaving the multi-user online event. The method also includes saving, by the one or more processors, the first user's participation state. The method further includes generating, by the one or more processors, a first token based on the saved participation state. The method also includes sending, by the one or more processors, a first invitation with the generated token to a plurality of prospective substitute users. The method further includes receiving, by the one or more processors, an acceptance of the invitation from a second user, wherein the second user is determined from the one of the plurality of prospective substitute users. The method also includes providing the second user with access to the multi-user online event continuing from the saved participation state.

In another example, the method further includes determining a prospective substitute user based on historical data, wherein the historical data is generated based on the substitute user's past participation state in a similar multi-user online event.

In yet another example, the method further includes when the first user is forcefully logged out from the multi-user online event, enabling co-participants of the first user in the multi-user online event to save the firsts user's participation state and generate the token.

In yet another example, the method further includes when the second user leaves the multi-user online event, generating a second token and sending a second invitation to a third user.

In yet another example, the method further includes when the first user is logging into the multi-user online event, allowing the first user to request not to save the participation state and in response to the first user's requesting not to save the participation state, allowing co-participants of the first user to decide to save the first user's participation state.

In yet another example, the multi-user online event includes an online multi-player game or a multi-user event in a collective virtual shared space using virtual reality or augmented reality.

In yet another example, the participation state is stored in a multi-user online event server.

In yet another example, wherein when one or more of the plurality of prospective substitute users attempt to accept the first invitation, co-participants of the first user determine who will be accepted as a new participant by voting.

In yet another example, the first invitation is broadcast to social media.

In yet another example, the broadcast to social media includes broadcasting to the first user's hangout or friend group.

Another aspect of the disclosure provides for a system comprising one or more processors and memory in communication with the one or more processors, wherein the memory contains instructions configured to cause the one or more processors to receive a request from a first user for leaving the multi-user online event. The instructions are also configured to cause the one or more processors to save the first user's participation state and generate a first token based on the saved participation state. The instructions are further configured to cause the one or more processors to send a first invitation with the generated token to a plurality of prospective substitute users. The instructions are also configured to cause the one or more processors to receive an acceptance of the invitation from a second user, wherein the second user is determined from the one of the plurality of prospective substitute users. The instructions are also configured to cause the one or more processors to provide the second user with access to the multi-user online event continuing from the saved participation state.

In another example, the instructions are further configured to cause the one or more processors to determine a prospective substitute user based on historical data, wherein the historical data is generated based on the substitute user's past participation state in a similar multi-user online event.

In yet another example, when the first user is forcefully logged out from the multi-user online event, the instructions are further configured to cause the one or more processors to enable co-participants of the first user in the multi-user online event to save the firsts user's participation state and generate the token.

In yet another example, when the second user leaves the multi-user online event, the instructions are further configured to cause the one or more processors to generate a second token and send a second invitation to a third user.

The above and other aspects of the disclosure can include one or more of the following features. In some examples, aspects of the disclosure provide for all of the following features, in combination.

In an example, the saved participation state is generated using one or more parameters.

In another example, the one or more parameters include the first user's roles, positions, level of expertise, ranks, and any items possessed by the first user in the multi-user online event.

In yet another example, the first token includes a QR code or an URL.

DETAILED DESCRIPTION

Figure 1:
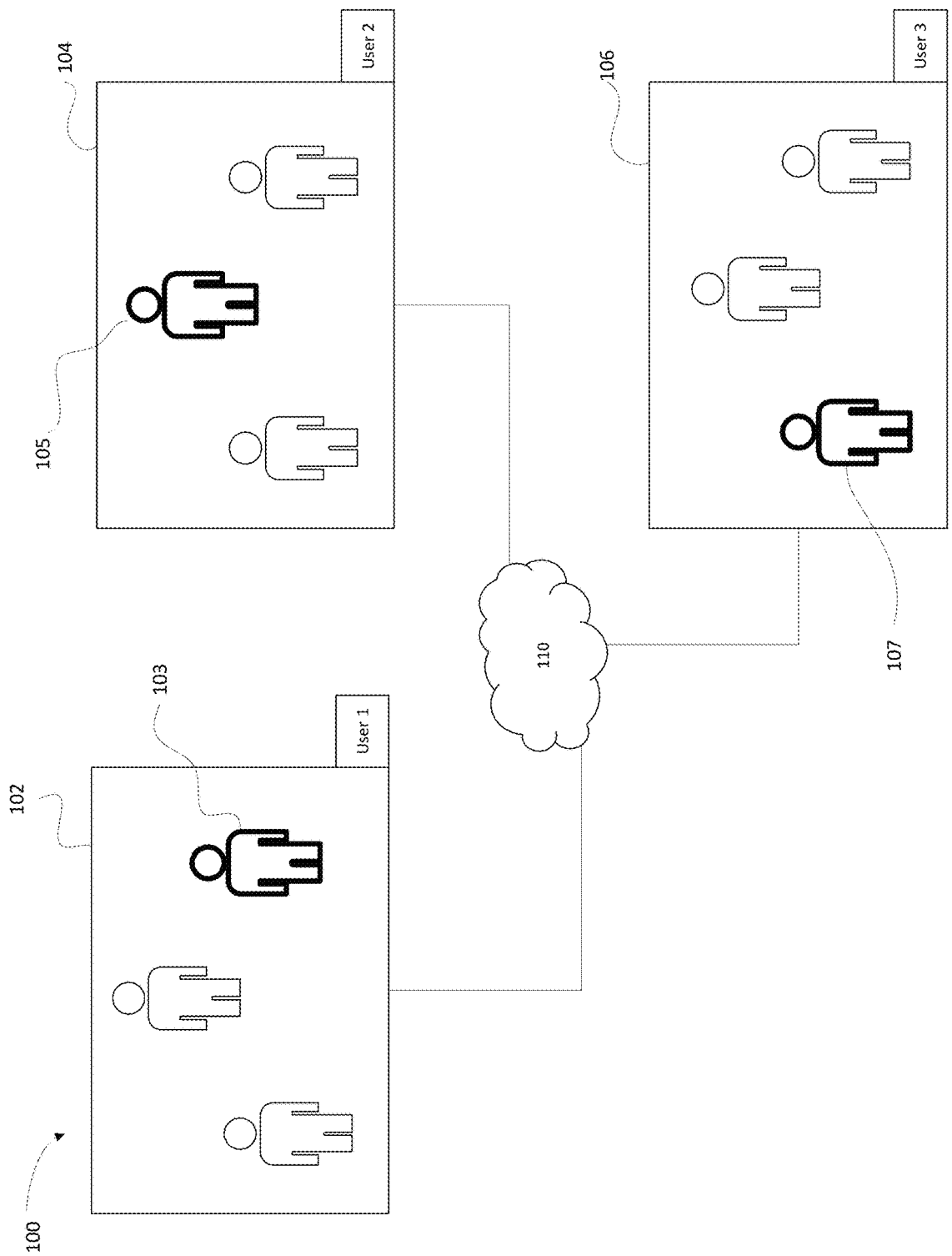
FIG. 1 depicts a block diagram of an example online multi-user game platform according to aspects of the disclosure.

Generally disclosed herein is an approach for enabling a substitute remote user to continue from an original user's saved participation state when the original user leaves an online multi-user event. The original user's participation state may be stored in association with a token, wherein the token may be a unique identifier such as a quick response (QR) code, a uniform resource locator (URL), or any other identifier. The token may be associated with various types of information including, but not limited to, the user's role, achievement, skills, and position. The token may be transmitted with an invitation to multiple prospective substitute users. One of the prospective substitute users may accept the invitation and may access the stored participation state using the token. The prospective substitute user that accepts the invitation and accesses the stored participation state may therefore become a substitute player for the original user and may participate in the online multi-user event continuing from the original user's saved participation state.

In some examples, the original user's profile information and credentials may be coupled with the original user's participation state. For example, when the original user leaves an online multi-user event, the original user's participation state may be automatically saved. In some other examples, the user's saved participation state may be copied and saved in separate storage from a game server and a corresponding token may be generated. In this regard, when the substitute user starts participating in the online multi-user event using the original user's saved participation state, the different user may not modify the original user's profile information.

In some examples, when a token is generated, the original user may provide input regarding the prospective substitute users to which the token will be offered. For example, the original user may designate a number of prospective substitute users, identify a particular group of prospective substitute users, specify a channel or platform through which to offer the token, etc. For example, the original user may elect to send an invitation to the original user's social media friend group, chat group, or any other common interest group of which the original user is a member. In one example, a small group of prospective substitute users may be selected from a larger group of prospective substitute users. Such selection may be based on the historical data of each prospective substitute user. Historical data may include prospective substitute users' past saved participation state or profile information associated with a similar online multi-user event. Based on the historical data, the token may be sent to a more tailored group of prospective substitute users.

In some examples, the token may be a QR code or a URL that may be activated when a prospective substitute user scans the QR code or follows the URL. For example, upon scanning the received QR code, the prospective substitute user may be directed to enter or join the online multi-user event. A URL may be sent to prospective substitute users' email or other messaging accounts with a brief description of the online multi-user event. The same QR code or URL may be scanned or activated using various user devices, such as smartphones, laptops, desktops, tablets, or any devices that can be used to participate in an online multi-user event. For example, a QR code may be sent to a prospective substitute user's email account. The prospective substitute user may open the email and scan the QR code using a smartphone. Upon scanning the QR code, the prospective substitute user may be prompted to select a device to start participating in the online multi-user event.

In some examples, multiple prospective substitute users may accept an invitation with a token and attempt to activate the identical token within a short time window. For example, when a first prospective substitute user accepts the invitation and attempts to activate the token, a second prospective substitute user may also accept the same invitation and attempt to activate the token immediately after the first prospective substitute user attempts to activate the token. A few minutes later, a third prospective substitute user accepts the invitation and attempts to activate the token as well. In the above example, the invitation may remain valid for a pre-determined length of time, such that more than one prospective substitute user may accept the invitation. In such instances, a determination as to which of the first, second, or third prospective substitute users can join the online multi-user event may be made in any number of ways and based on various criteria. As one example, the first prospective substitute user to accept the invitation and/or access the token may be permitted entry and subsequent acceptances may fail. As another example, the first, second, or third prospective substitute users may bid on the token and the winning bid may be selected. As yet another example, the remaining participants of the online multi-user event may be presented with an indication of the first, second, and third prospective substitute users that accepted the invitation and may select one of the prospective substitute users to be granted access to the online multi-user event. For example, the remaining participants may vote on the prospective substitute users to be granted access.

According to some examples, the original user may experience network trouble and may be forced to log out. In such a case, the original user may not be able to approve the transmission of the invitation or save the original user's participation state. In such a case, the remaining participants may elect to save the original user's participation state and send a token containing the original user's participation state to the prospective substitute users.

According to some examples, prospective substitute users to which the invitation and token will be sent may be selected based on the user profiles of the prospective substitute users. For example, participants may each have a user profile including various profile information. The profile information may be generated, for example, based on historical data of the participants. For example, where the online multi-user event is a video game, the profile information may include the gaming history of each user. The participation state of the original user may be compared to the profile information of prospective substitute users. Based on such comparison, one or more of the prospective substitute users may be selected for substitution in the online multi-user event.

According to some examples, when the original user leaves the online multi-user event and a token is transmitted to one or more prospective substitute users, one of the prospective substitute users may accept the token and start participating in the online multi-user event. When the substitute user leaves the online multi-user event, a second token may be generated. The second token may include a different QR code or a different URL from the first QR code or the first URL.

According to some examples, when the original user logs into an online multi-user event, the original user may be prompted to select whether or not to store the user's participation state. If the user selects not to save the participation state, there will be no saved participation state, and thus, no token will be generated. In some other examples, if the user elects not to save the participation state, the remaining participants may vote to save the participation state of the original user and generate a token.

According to some examples, various parameters may be factored into generating a token when a user leaves an online multi-user event. Such parameters may include a user's participation statistical information, a user's role statistical information, and participation state information of the online multi-user event. User's participation statistical information may include the user's participation level, skills, ranks, and abilities. User's role statistical information may include what type of role the user is playing, characteristics of the role, or special features of the role. The user's participation state information may include the user's position of the role in the online multi-user event, posture information of the role, and any progress made by the role.

According to some examples, online multi-user events may include online multi-user games, online collaborative meetings, or any type of multi-user event in a collective virtual shared space. In some examples the online multi-user events may include virtual reality or augmented reality. In the example of an online game, the original user state may include information such as player statistics, position, rewards, score, etc. In the example of an online collaborative meeting, the original user state may include information such as questions/answers previously submitted, slides that the original user has presented, etc. Such original user state may be offered to colleagues of the original user that can resume the original user's role.

Figure 2A:
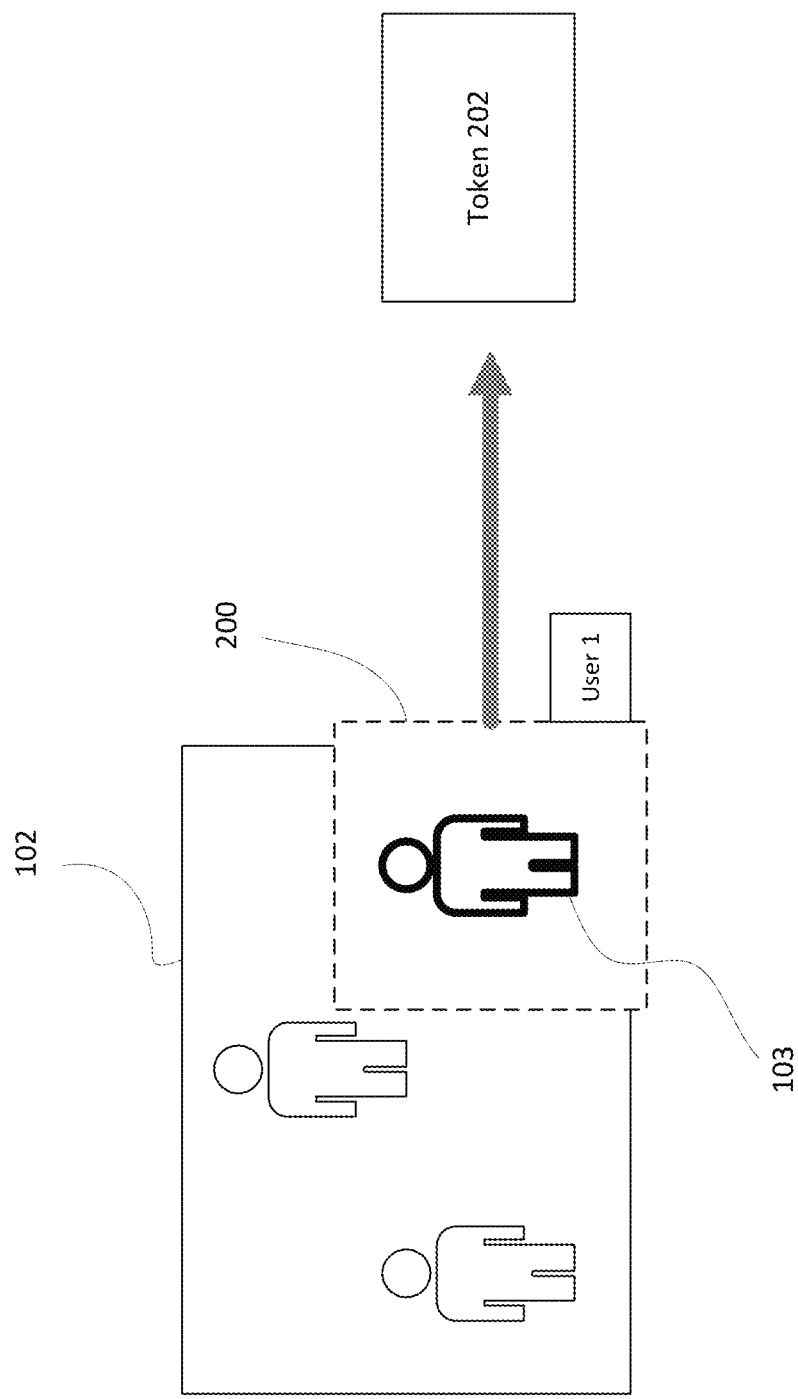
FIG. 2A depicts a block diagram of an example token generated based on a user's saved participation state according to aspects of the disclosure.
Figure 2B:
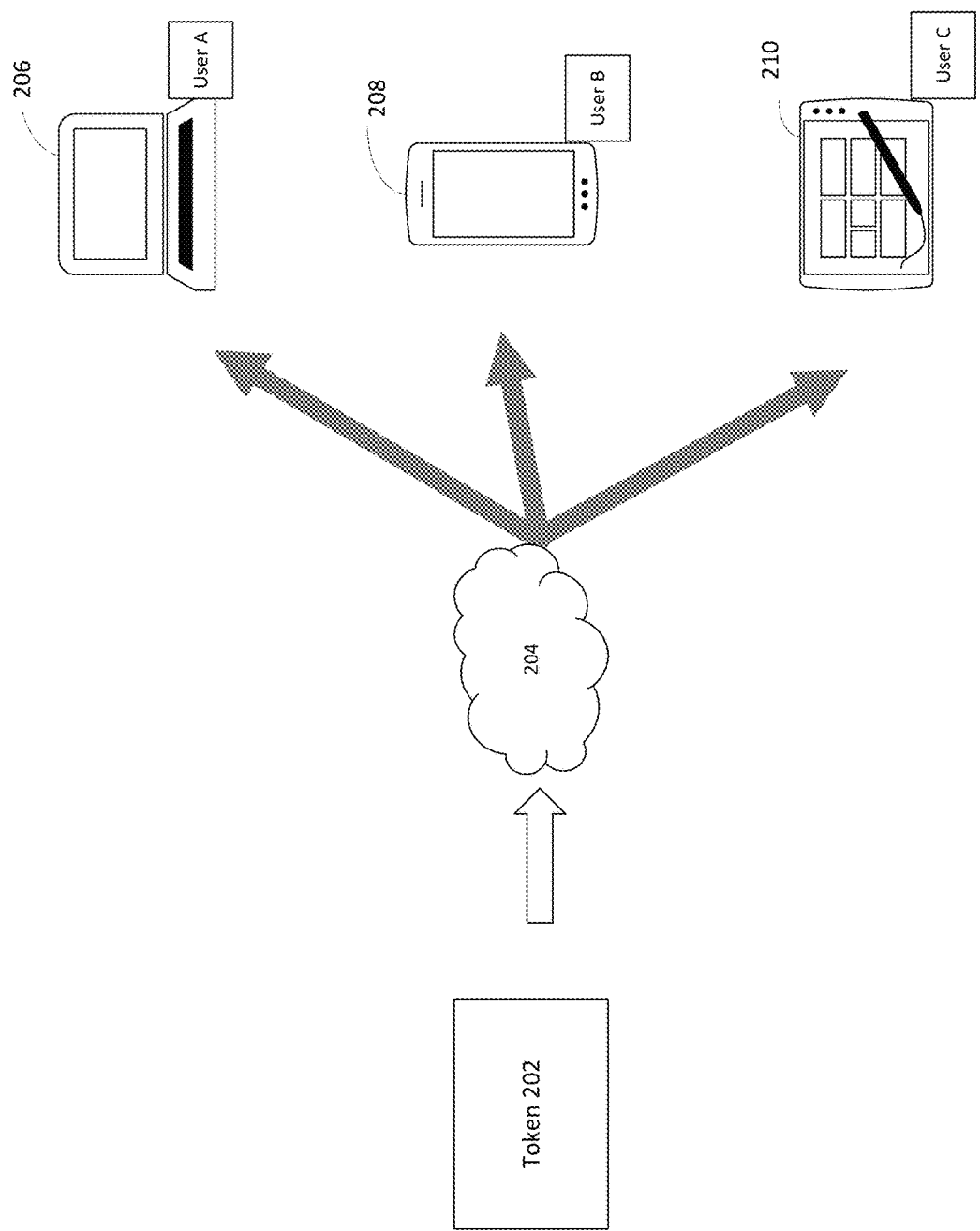
FIG. 2B depicts a block diagram of an example token distributed to multiple prospective substitute users according to aspects of the disclosure.
Figure 2C:
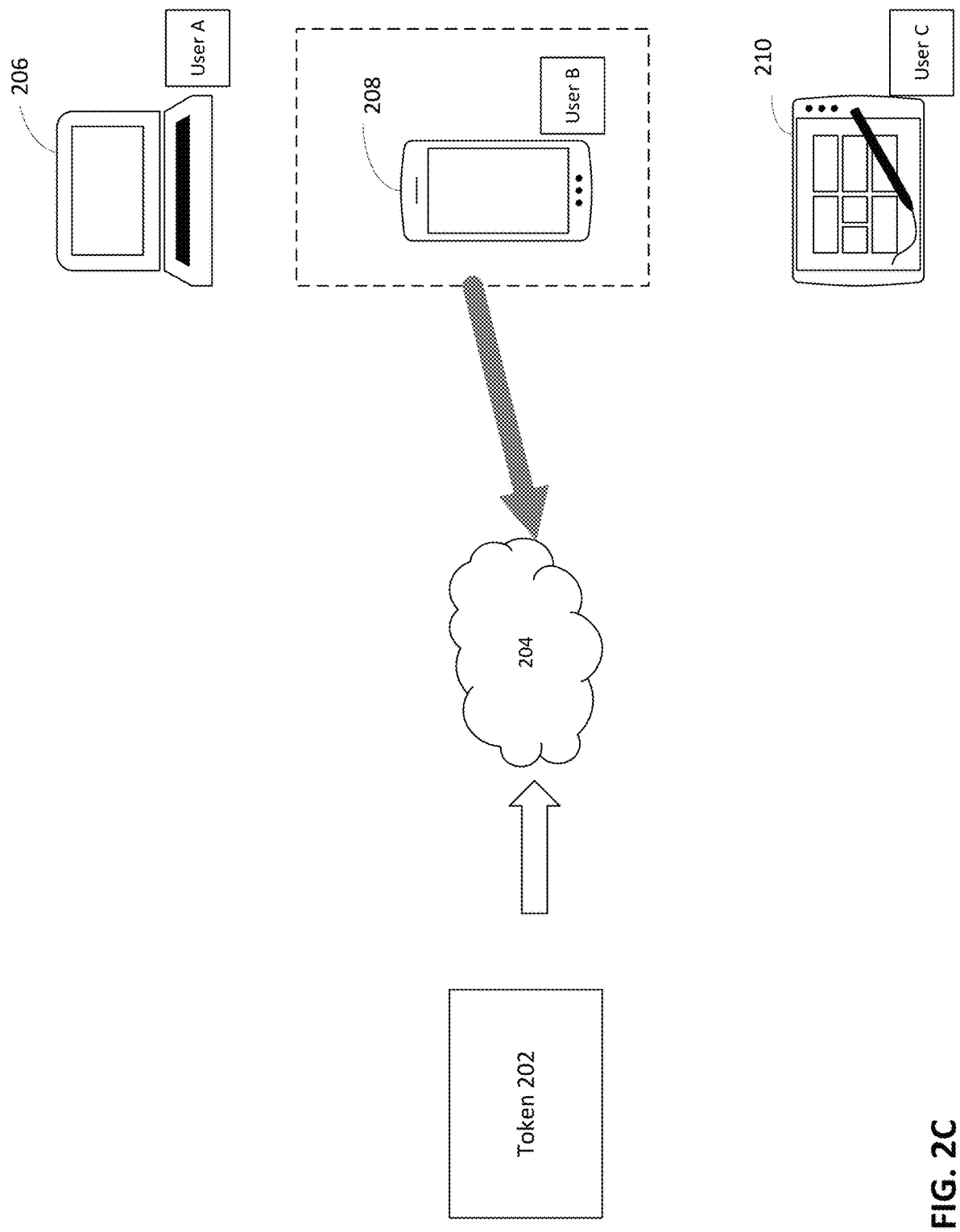
FIG. 2C depicts a block diagram of an example token accepted by one of the multiple prospective substitute users according to aspects of the disclosure.
Figure 2D:
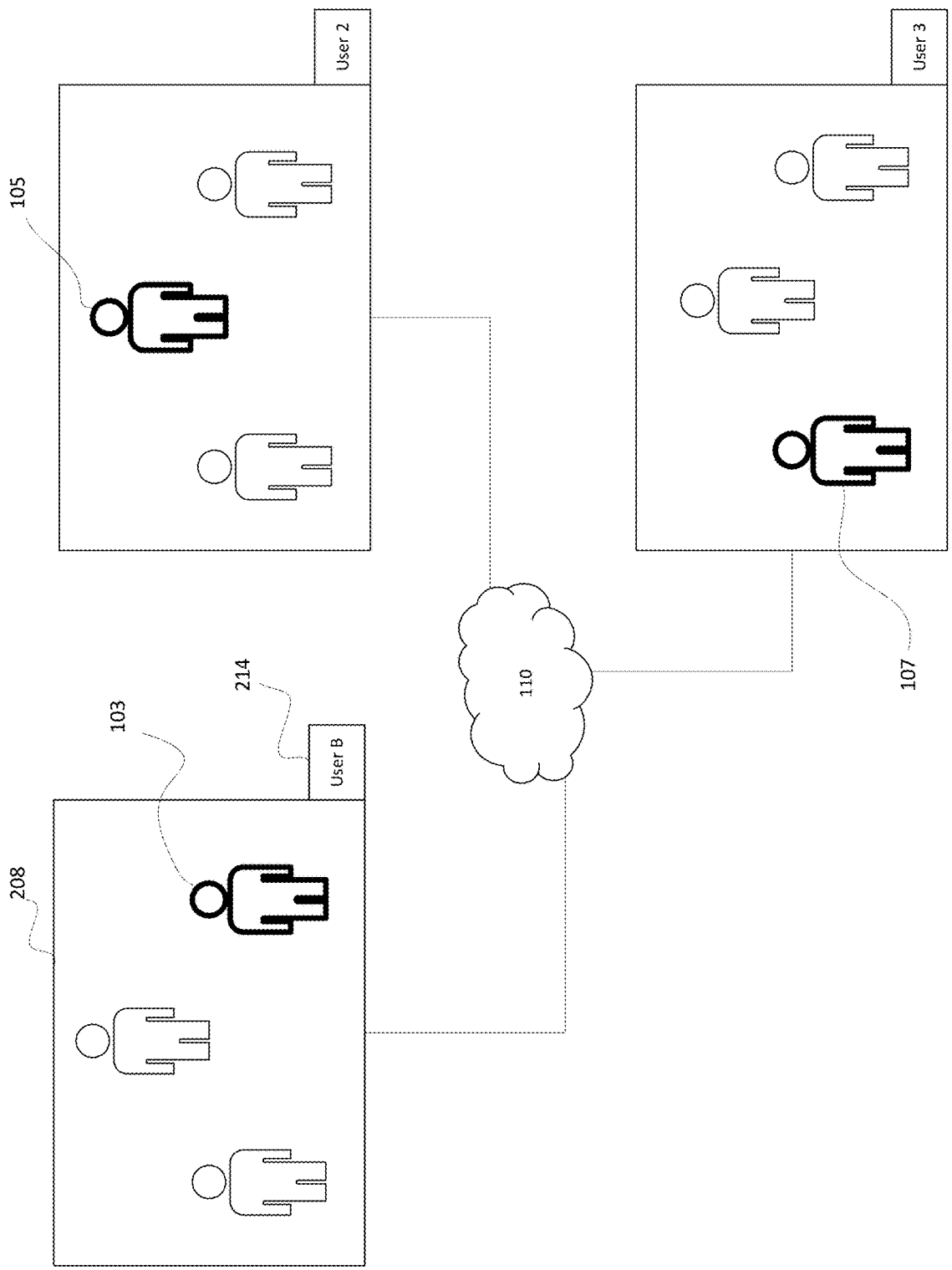
FIG. 2D depicts a block diagram of an example online multi-user game platform with a new substitute user according to aspects of the disclosure.
Figure 3:
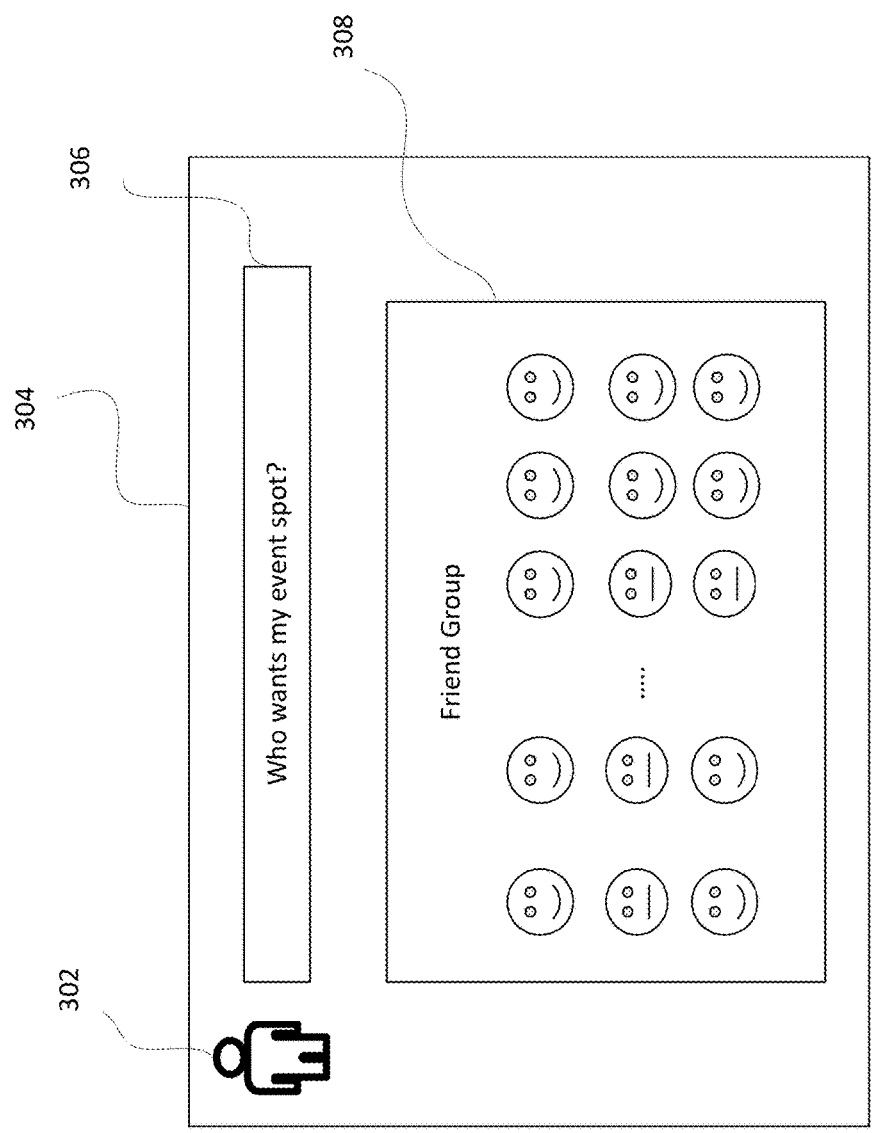
FIG. 3 depicts a block diagram of example broadcasting of a stored token to friend groups on social media according to aspects of the disclosure.

FIGS. 1-3 illustrate an example implementation of the present technology in an online-multi-user game setting.

FIG. 1 depicts a block diagram of an example online multi-user game platform. The online multi-user game environment 100 may include character 103 operated by user 1 through computing device 102, character 105 operated by user 2 through computing device 104, and character 107 operated by user 3 through computing device 106. Each computing device 102-106 may be connected and communicate with one another via network 110.

FIG. 2A depicts an example where user 1 desires to leave the online game, which conventionally would end the involvement of character 103. However, rather than ending the involvement of character 103, the character's state in the online multi-user event is saved and associated with token 202. When user 1 decides to leave the online game, user 1 may elect to save character 103's participation state information and generate token 202 based on user 1's participation state. Character 103's participation state information may include the user's statistical information (user stats). User stats may include levels, rank, powers, abilities, and artifacts. Each level may indicate whether the user is a novice, intermediate, master, or expert. Rank, for example, may indicate whether the user's rank is bronze, silver, or gold. Powers may include the powers that may be unlocked with each level and information regarding upgraded levels of unlocked powers. For example, level 1 may indicate basic power and level 5 may indicate advanced power. User stats may also include character 103's main abilities based on its role in online game 102. Artifacts may include special items such as skins, coins, gems, etc. Character 103's stats may also include character 103's role statistical information (role stats). Character 103's role stats may include information related to what role is being played. For example, character 103's role may be tank, defense, or offense. Character 103's role stats may also include different skins that may be unlocked for different roles. Character 103's role stats may further include the power and abilities of the role. For example, there may be different powers or weapons associated with particular skins or spells that character 103 may cast in online game 102 as a special ability. Special abilities may be obtained as character 103 reaches a certain level in online game 102 or collects predetermined amounts of experience points (XP). Character 103's role stats may also include the current level of character 103.

In some examples, character 103's participation state information may also include character 103's play state in the online game. Character 103's play state may include the position of the character on a map in the online game. For example, character 103 may be hiding in the jungle, and character 103's play state may save the x-y-z coordinate of character 103's hiding spot. Character 103's play state may further include the posture of character 103. For example, character 103 may be standing, crouching, or sitting in the online game when user 1 decides to leave the online game. Character 103's play state may include character 103's current health point (HP), powers, weapons, or boosters such as health kits or ammunition in use. Character 103's play state may also include character 103's last movement and the movement's direction, speed, and any special power associated with the movement. Character 103's play state may also include unlocked abilities and powers of character 103, total damages inflicted to character 103, and difficulty level of the online game selected by user 1.

FIG. 2B depicts a block diagram of an example token associated with the online state of player 1. Token 202 may be, by way of example, a QR code, a URL, or other identifiers. The token 202 may be distributed to multiple prospective substitute users, such as User A, User B, and User C. While only a few prospective substitute users are illustrated, it should be understood that the token 202 may be provided to any number of prospective substitute users, such as by being broadcast through network 204. Token 202 may be sent to various users on various devices via network 204. For example, such devices may include desktops, laptops, smartphones, tablets, gaming consoles, alternative reality headsets, or any other type of electronic computing device. User A may receive token 202 via network 204 on device 206. User B may receive token 202 via network 204 on device 208 and user C may receive token 202 via network 204 on device 210. Token 202 may be sent to users A-C with a formal invitation via emails, text messages, or any type of notification application. Token 202 may also be uploaded to a social media site, such that users A-C may download token 202 if users A-C are friends of the original user.

FIG. 2C depicts a block diagram of an example token accepted by one of the multiple prospective substitute users. In this example, user B accepts and activates token 202 using device 208. User A may activate token 202 after user B activate token 202 and user C may not be responding. For example, user B may receive a QR code on user B's smartphone and scan the QR code displaying on user B's smartphone using other devices or machines, such as video game consoles, arcade game machines, desktops, laptops, tablets, etc. In another example, token 202 may include a URL sent to user B's device 208 via text messaging. Once user B clicks the URL, user B may be directed to enter the online multi-user game. In one example, an online multi-user game server may regard the activation of token 202 as an acceptance and disable token 202 to prevent other users from activating token 202. For example, as soon as user B activates token 202 using device 208, user A or user C may not be able to scan the QR code or open the links contained in the URL.

In other examples, users A, B, and C, may each express an interest in resuming play in place of user 1. In such examples, user 2 and user 3 (FIG. 1) may provide input as to which of users A-C should be selected. For example, user 2 and user 3 may be prompted to select a new user from multiple prospective substitute users. User 2 and user 3 may review each prospective substitute user's historical data and select a new user with the historical data closest to user 1's historical data.

FIG. 2D depicts a block diagram of an example online multi-user game platform with a new substitute user. In this example, user B 214 joins the online multi-user game using device 208 as character 103, resuming play with character 103 where user 1 left off. Character 103 may continue to interact with character 105 controlled by user 2 and character 107 controlled by user 3 via network 110, by continuing from character B's previous play state and inheriting character B's previous role stats and user stats.

FIG. 3 depicts a block diagram of example friend groups on social media and broadcasting of a stored token. Window 304 may include a browser or application window from social media site. Banner 306 may include an advertisement message such as "who wants my event spot" and a link directed to a QR code or an URL. Character 302 may indicate a user that is broadcasting the advertisement message. User 302 may be, for example, user 1, user 2, or user 3, or any other user relaying the message received from someone else. Friend group 308 may represent the social media friends of user 302. In some examples, friend group 308 may include a pre-defined group of users that may possess similar interests or profile information as user 302.

Figure 4:
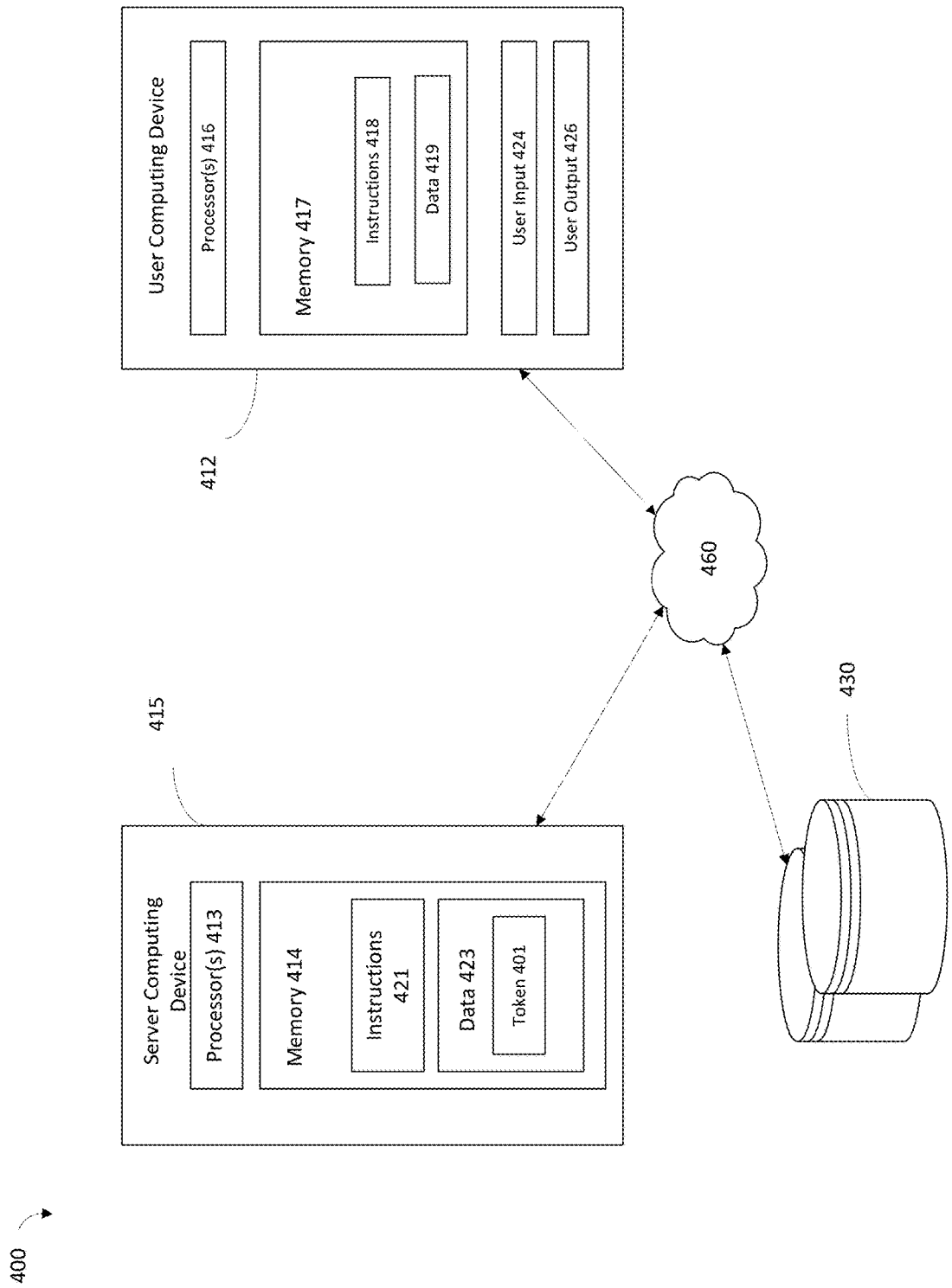
FIG. 4 depicts a block diagram of an example token-generating system according to aspects of the disclosure.

FIG. 4 depicts a block diagram of an example token-generating system. An online multi-user game can be implemented on one or more devices having one or more processors in one or more locations, such as in server computing device 415. User computing device 412 and the server computing device 415 can be communicatively coupled to one or more storage devices 430 over a network 460. The storage device(s) 430 can be a combination of volatile and non-volatile memory and can be at the same or different physical locations than the computing devices 412, 415. For example, the storage device(s) 430 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 415 can include one or more processors 413 and memory 414. The memory 414 can store information accessible by the processor(s) 413, including instructions 421 that can be executed by the processor(s) 413. The memory 414 can also include data 423 that can be retrieved, manipulated or stored by the processor(s) 413. The memory 414 can be a type of non-transitory computer readable medium capable of storing information accessible by the processor(s) 413, such as volatile and non-volatile memory. The processor(s) 413 can include one or more central processing units (CPUs), graphic processing units (GPUs), field-programmable gate arrays (FPGAs), and/or application-specific integrated circuits (ASICs), such as tensor processing units (TPUs).

The instructions 421 can include one or more instructions that when executed by the processor(s) 413, causes the one or more processors to perform actions defined by the instructions. The instructions 421 can be stored in object code format for direct processing by the processor(s) 413, or in other formats including interpretable scripts or collections of independent source code modules that are interpreted on demand or compiled in advance. The instructions 421 can include instructions for implementing processes consistent with aspects of this disclosure. Such processes can be executed using the processor(s) 413, and/or using other processors remotely located from the server computing device 415.

The data 423 can be retrieved, stored, or modified by the processor(s) 413 in accordance with the instructions 421. The data 423 may include token 401. The data 423 can be stored in computer registers, in a relational or non-relational database as a table having a plurality of different fields and records, or as JSON, YAML, proto, or XML documents. The data 423 can also be formatted in a computer-readable format such as, but not limited to, binary values, ASCII or Unicode. Moreover, the data 423 can include information sufficient to identify relevant information, such as numbers, descriptive text, proprietary codes, pointers, references to data stored in other memories, including other network locations, or information that is used by a function to calculate relevant data.

The user computing device 412 can also be configured similar to the server computing device 415, with one or more processors 416, memory 417, instructions 418, and data 419. The user computing device 412 can also include a user output 426, and a user input 424. The user input 424 can include any appropriate mechanism or technique for receiving input from a user, such as keyboard, mouse, mechanical actuators, soft actuators, touchscreens, microphones, and sensors.

The server computing device 415 can be configured to transmit data to the user computing device 412, and the user computing device 412 can be configured to display at least a portion of the received data on a display implemented as part of the user output 426. The user output 426 can also be used for displaying an interface between the user computing device 412 and the server computing device 415. The user output 426 can alternatively or additionally include one or more speakers, transducers or other audio outputs, a haptic interface or other tactile feedback that provides non-visual and non-audible information to the platform user of the user computing device 412.

Although FIG. 4 illustrates the processors 413, 416 and the memories 414, 417 as being within the computing devices 415, 412, components described in this specification, including the processors 413, 416 and the memories 414, 417 can include multiple processors and memories that can operate in different physical locations and not within the same computing device. For example, some of the instructions 421, 418 and the data 423, 419 can be stored on a removable SD card and others within a read-only computer chip. Some or all of the instructions and data can be stored in a location physically remote from, yet still accessible by, the processors 413, 416. Similarly, the processors 413, 416 can include a collection of processors that can perform concurrent and/or sequential operation. The computing devices 415, 412 can each include one or more internal clocks providing timing information, which can be used for time measurement for operations and programs run by the computing devices 415, 412.

The server computing device 415 can be configured to receive requests to process data from the user computing device 412. For example, the environment 400 can be part of a computing platform configured to provide a variety of services to users, through various user interfaces and/or APIs exposing the platform services. One or more services may be online multi-user event participation. The user computing device 412 may receive and transmit data related to an online multi-user event participants' state, profile information, historical data, etc.

The devices 412, and 415 can be capable of direct and indirect communication over network 460. The devices 412, and 415 can set up listening sockets that may accept an initiating connection for sending and receiving information. The network 460 itself can include various configurations and protocols including the Internet, World Wide Web, intranets, virtual private networks, wide area networks, local networks, and private networks using communication protocols proprietary to one or more companies.

Although a single server computing device 415 and user computing device 412 are shown in FIG. 4, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Figure 5:
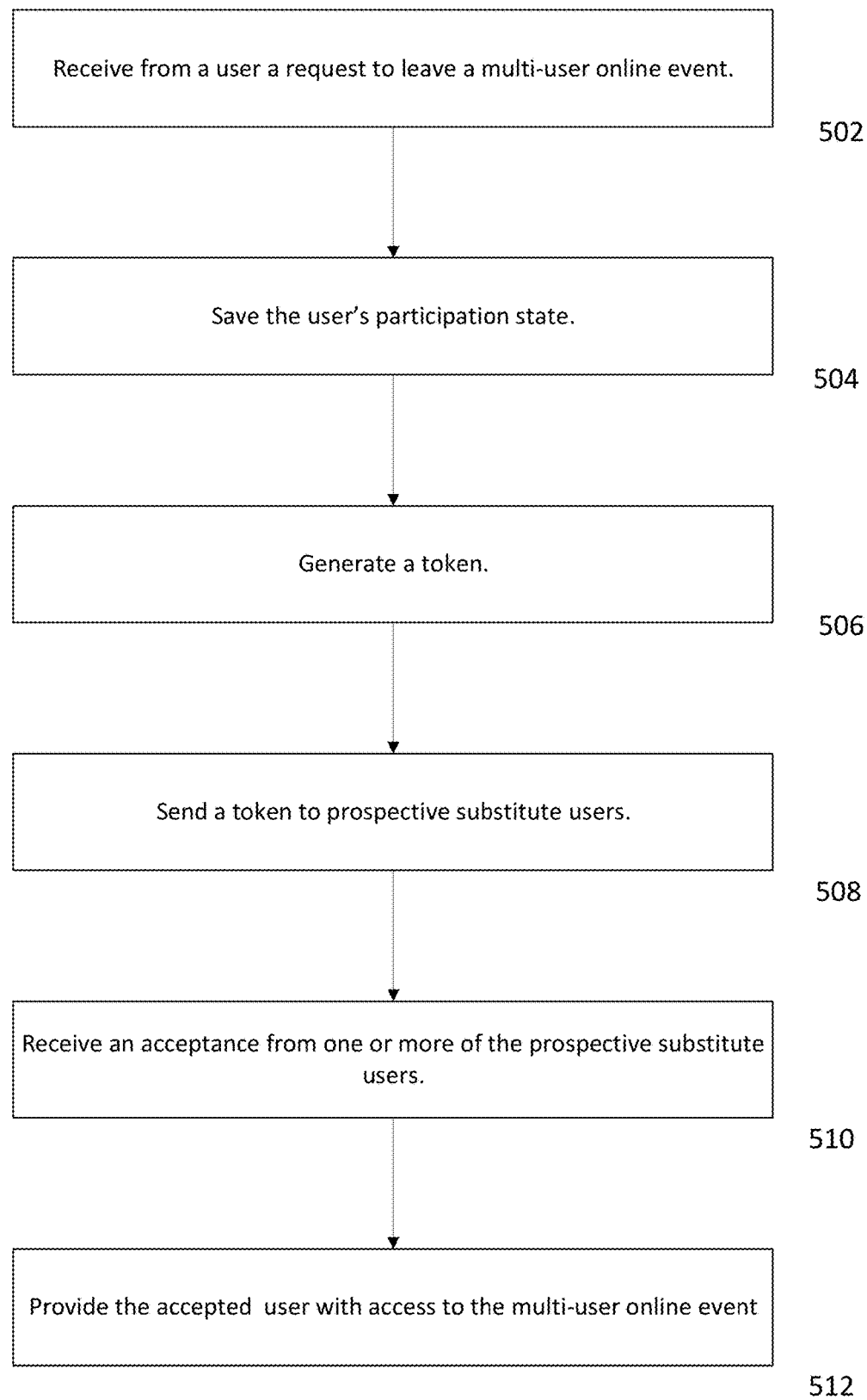
FIG. 5 depicts a flow diagram of an example method for providing a token for an online multi-user event to a substitute user according to aspects of the disclosure.

FIG. 5 depicts a flow diagram of an example method for providing a token to a substitute user. According to block 502, a request for leaving the online multi-user event is received from the original user of an online multi-user event. The online multi-user event may be, for example, a game, meeting, presentation, etc. According to some examples, the original user may request to leave the online multi-user event and save the participation state. The original user may have the option for opting out of saving the original user's participation state when the original user first logs in.

According to block 504, the original user's participation state is saved. The saved participation state may be used to generate a token. According to some examples, the original user may save the participation state and store the saved participation state locally. The original user may come back anytime and restart from the original participation state using the locally saved participation state.

According to block 506, a token may be generated based on the original user's participation state. A token may comprise a QR code, and when a prospective substitute user activates the QR code, the saved participation state information of the original user may be downloaded from the server and the prospective substitute user may continue from the original user's participation state.

According to block 508, the generated token may be sent to multiple prospective substitute users. According to some examples, a QR code may be posted to a social media site or shared with a friend group via a group chatting application or text messaging application. Multiple prospective substitute users may be preselected to closely match the original user's interests and skills, According to block 510, an acceptance from one or more prospective substitute users may be received. According to some examples, when one or more prospective substitute users accept the token, a server computing device such as device 415 illustrated in FIG. 4 may determine which user to select. Device 415 may select a prospective substitute user who activated the token first. In another example, the server computing device may wait to receive pre-configured numbers of acceptances from the prospective substitute users and select a single prospective substitute user with historical data that matches the original user's profile information.

According to block 512, access to the multi-user online event may be provided to the accepted prospective substitute user. With access, the selected prospective substitute user may start participation continuing from the original user's participation state.

Figure 6:
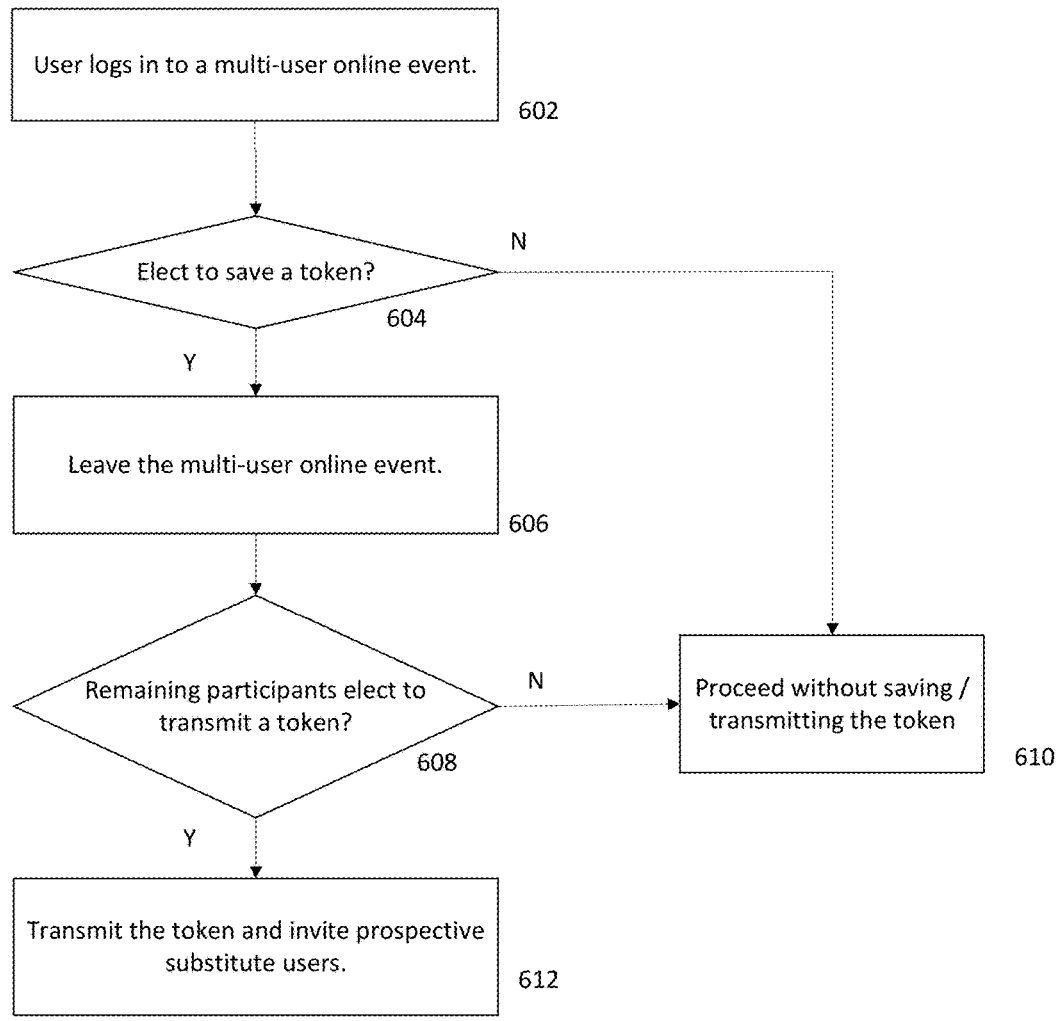
FIG. 6 depicts a flow diagram of an example method for providing a token for an online multi-user event to a substitute user when the original user elects not to store the participation state according to the aspects of the disclosure.

FIG. 6 depicts a flow diagram of an example method for providing an online participation state token to a substitute user when the original user has options for storing the participation state in the beginning. According to block 602, the original user may log in to a multi-user online event. The original user may log in using various devices, such as a video game console, a smartphone, a TV, a laptop, etc.

According to block 604, the original user may be prompted to choose "allow" or "not allow" to save the original user's participation state. If the original user elects not to save the original user's participation state, the original user may proceed with participating in the online multi-user event without saving the participation state at block 610. If the original user elects to save the original user's participation state, the user may proceed with participating in the online multi-user event until the original user leaves the online multi-user event at block 606.

According to block 606, the original user may leave the online multi-user event. In some examples, the original user may experience an unstable network and may be logged out by a server computing device. In such a case, if the original user elected to save the original user's participation state in the beginning, the saved original user's participation state will be converted to a token.

According to block 608, the remaining participants may either elect or elect not to transmit a generated token to multiple prospective substitute users. If the remaining participant elects not to transmit the generated token to multiple prospective substitute users, the remaining participants may continue without a substitute user at block 610.

According to block 612, if the remaining participants elect to transmit the generated token to multiple prospective substitute users, the token may be transmitted to prospective substitute users and one or more prospective substitute users are invited.

Figure 7:
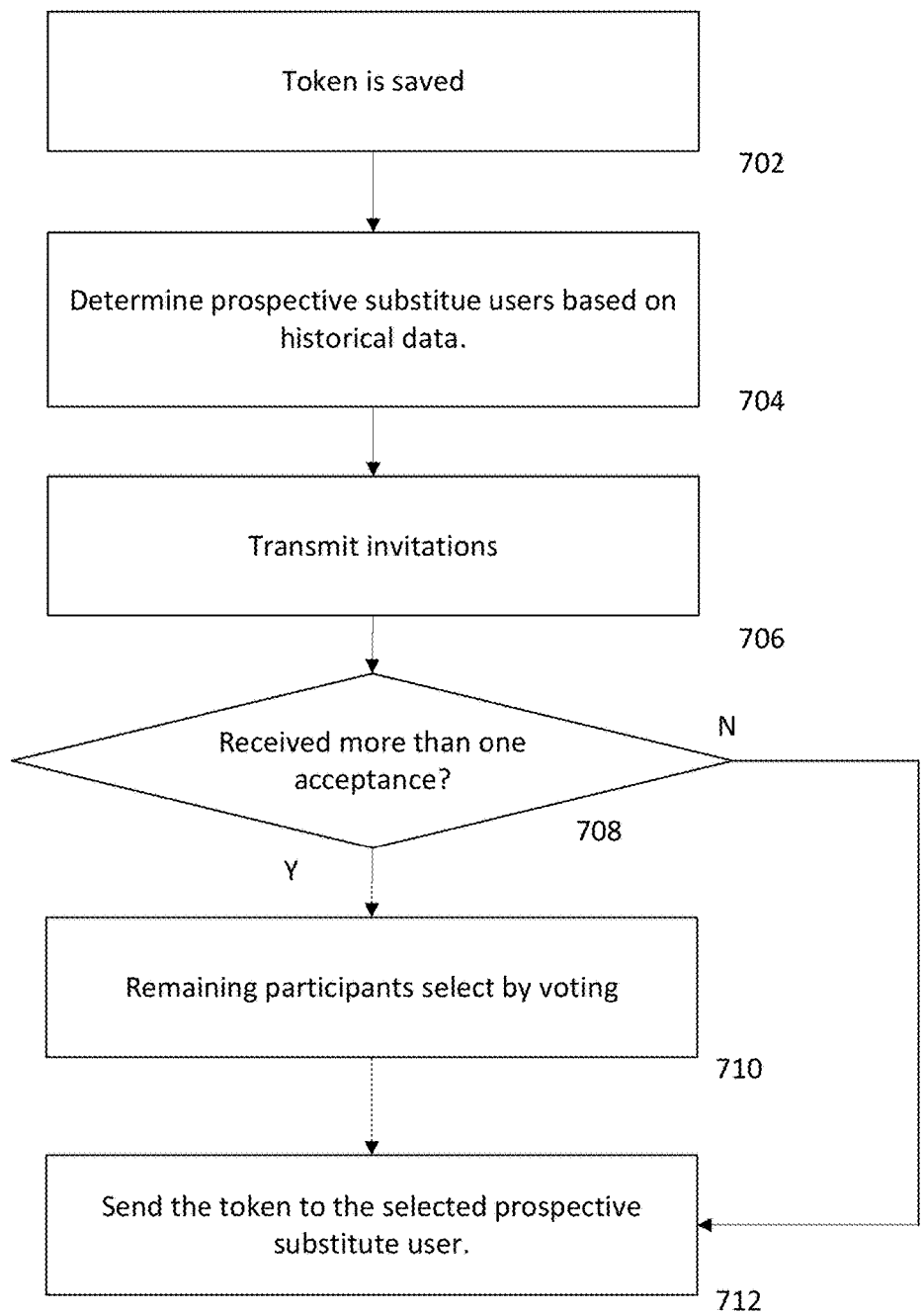
FIG. 7 depicts a flow diagram of an example method for selecting a substitute user when one or more prospective substitute users accept invitations with a stored token according to the aspect of the disclosure.

FIG. 7 depicts a flow diagram of an example method for selecting a substitute user when one or more prospective substitute users accept invitations with a stored token. According to block 702, a token is saved. A token may include various statistical information that may be compared with historical data of general substitute users. General substitute users may include a larger group of potential substitute users who may or may not share similar interests, skills, or historical data.

According to block 704, a group of prospective substitute users is selected. According to some examples, prospective substitute users may include users that have participated in a similar online multi-user event in the past. A token may be used to pre-select prospective substitute users from a larger group of general substitute users based on the above comparison.

According to block 706, invitations may be sent to the selected prospective substitute users. In some examples, the invitations may not include a token. The invitation may be sent to the selected prospective substitute users via a social media post without a token. The invitation may also be sent via email or text messages without a token.

According to block 708, the invitations may or may not be accepted by more than one prospective substitute user. If the invitations are accepted by more than one prospective substitute user, the remaining participants of the online multi-user event select a single prospective substitute user by voting at block 710. If the invitations are only accepted by a prospective substitute user, the token may be sent to the prospective substitute user at block 713.

According to block 710, the remaining participants may select a prospective substitute user from multiple prospective substitute users. For example, the remaining participants may receive profile information and historical data about the prospective substitute users who accepted the invitations. Each remaining participant may cast a vote and based on the results of the votes a single prospective substitute user may be selected.

According to block 712, the selected prospective substitute user may receive the token and activate the token to join the online multiple-user event.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

Although the technology herein has been described with reference to particular examples, it is to be understood that these examples are merely illustrative of the principles and applications of the present technology. It is therefore to be understood that numerous modifications may be made and that other arrangements may be devised without departing from the spirit and scope of the present technology as defined by the appended claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method for substituting a user in a multi-user online event, the method comprising:
   receiving, by one or more processors, a request from a first user for leaving the multi-user online event;
   saving, by the one or more processors, the first user's participation state;
   generating, by the one or more processors, a first token based on the saved participation state;
   sending, by the one or more processors, a first invitation with the generated token to a plurality of prospective substitute users;
   receiving, by the one or more processors, an acceptance of the invitation from a second user, wherein the second user is determined from the one of the plurality of prospective substitute users; and
   providing the second user with access to the multi-user online event continuing from the saved participation state.

2. The method of 1, wherein the saved participation state is generated using one or more parameters.

3. The method of 2, wherein the one or more parameters include the first user's roles, positions, level of expertise, ranks and any items possessed by the first user in the multi-user online event.

4. The method of 1, further comprising:
   determining a prospective substitute user based on historical data, wherein the historical data is generated based on the substitute user's past participation state in a similar multi-user online event.

5. The method of 1, further comprising:
   when the first user is forcefully logged out from the multi-user online event, enabling co-participants of the first user in the multi-user online event to save the firsts user's participation state and generate the token.

6. The method of 1, further comprising:
   when the second user leaves the multi-user online event, generating a second token; and
   sending a second invitation to a third user.

7. The method of 1, further comprising:
   when the first user is logging into the multi-user online event, allowing the first user to request not to save the participation state; and
   in response to the first user's requesting not to save the participation state, allowing co-participants of the first user to decide to save the first user's participation state.

8. The method of 1, wherein the first token includes a QR code or an URL.

9. The method of 1, wherein the multi-user online event includes an online multi-player game or a multi-user event in a collective virtual shared space using virtual reality or augmented reality.

10. The method of 1, wherein the participation state is stored in a multi-user online event server.

11. The method of 1, wherein when one or more of the plurality of prospective substitute users attempt to accept the first invitation, co-participants of the first user determine who will be accepted as a new participant by voting.

12. The method of 1, wherein the first invitation is broadcast to social media.

13. The method of 12, wherein the broadcast to social media includes broadcasting to the first user's hangout or friend group.

14. A system comprising:
one or more processors;
memory in communication with the one or more processors, wherein the memory contains instructions configured to cause the one or more processors to:
receive a request from a first user for leaving the multi-user online event;
save the first user's participation state;
generate a first token based on the saved participation state;
send a first invitation with the generated token to a plurality of prospective substitute users;
receive an acceptance of the invitation from a second user, wherein the second user is determined from the one of the plurality of prospective substitute users; and
provide the second user with access to the multi-user online event continuing from the saved participation state.

15. The system of 14, wherein the saved participation state is generated using one or more parameters.

16. The system of 15, wherein the one or more parameters include the first user's roles, positions, level of expertise, ranks and any items possessed by the first user in the multi-user online event.

17. The system of 14, wherein the instructions are further configured to cause the one or more processors to determine a prospective substitute user based on historical data, wherein the historical data is generated based on the substitute user's past participation state in a similar multi-user online event.

18. The system of 14, wherein when the first user is forcefully logged out from the multi-user online event, the instructions are further configured to cause the one or more processors to enable co-participants of the first user in the multi-user online event to save the firsts user's participation state and generate the token.

19. The system of 14, wherein when the second user leaves the multi-user online event, the instructions are further configured to cause the one or more processors to generate a second token and send a second invitation to a third user.

20. The system of 14, wherein the first token includes a QR code or an URL.

* * * * *